United States Patent
Catelli et al.

(10) Patent No.: US 11,510,287 B2
(45) Date of Patent: Nov. 22, 2022

(54) OHMIC HEATER

(71) Applicant: CFT S.P.A., Parma (IT)

(72) Inventors: Roberto Catelli, Parma (IT); Stefano Romei, Parma (IT); Paolo Cova, Parma (IT); Andrea Toscani, Salsomaggiore Terme (IT); Alessandro Soldati, Langhirano (IT); Giovanni Franceschini, Reggio Nell'emilia (IT)

(73) Assignee: CFT S.P.A., Parma (IT)

(*) Notice: Subject to any disclaimer, the term of this patent is extended or adjusted under 35 U.S.C. 154(b) by 294 days.

(21) Appl. No.: 16/767,989

(22) PCT Filed: Dec. 4, 2018

(86) PCT No.: PCT/IB2018/059606
§ 371 (c)(1),
(2) Date: May 28, 2020

(87) PCT Pub. No.: WO2019/111141
PCT Pub. Date: Jun. 13, 2019

(65) Prior Publication Data
US 2021/0195692 A1    Jun. 24, 2021

(30) Foreign Application Priority Data
Dec. 4, 2017 (IT) .......................... 102017000139856

(51) Int. Cl.
*H05B 3/00* (2006.01)
*H02M 5/458* (2006.01)

(52) U.S. Cl.
CPC .......... *H05B 3/0023* (2013.01); *H02M 5/458* (2013.01)

(58) Field of Classification Search
CPC ............................ H05B 3/0023; H02M 5/458
See application file for complete search history.

(56) References Cited

U.S. PATENT DOCUMENTS

| | | |
|---|---|---|
| 5,355,299 A | 10/1994 | Carpita |
| 5,481,451 A | 1/1996 | Kuwahara |
| 2007/0047612 A1 | 3/2007 | Keough |

FOREIGN PATENT DOCUMENTS

EP    0580192 B1    3/1997

OTHER PUBLICATIONS

Ramos et al., Ohmic Heating of Food by means of High Frequency Power Inverters, Sep. 2013, IEEE, EPE2013, 10 (Year: 2013).*

* cited by examiner

*Primary Examiner* — Jue Zhang
(74) *Attorney, Agent, or Firm* — Pearne & Gordon LLP

(57) ABSTRACT

An ohmic heater for heating a food product, including: a rectifier (2) for rectifying the supply voltage; an inverter (3) including controlled switches (30); a pair (4) of electrodes that can be positioned in contact with the food product to be heated, said inverter (3) being operatively interposed between the rectifier (2) and the pair (4) of electrodes; a device (5) for determining an oscillating voltage (X) generated by the rectifier (2); a system (800) for regulating the closing duration of the switches (30) of the inverter (3) at least as a function of the corresponding voltage (X) generated by the rectifier (2) and determined at a given time instant by the device (5) for determining an oscillating voltage (X).

7 Claims, 3 Drawing Sheets

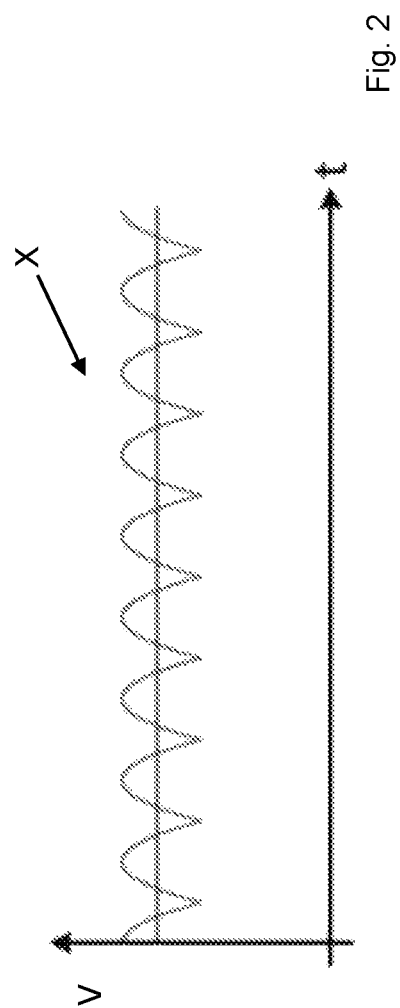
Fig. 2
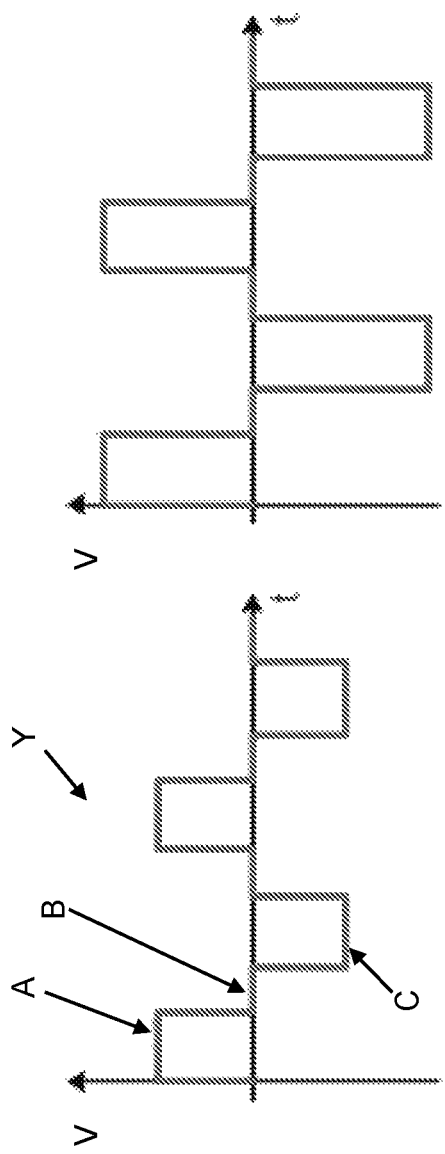
Fig. 3a
Fig. 3b

OHMIC HEATER

TECHNICAL FIELD

The present invention refers to an ohmic heater. It can be used to heat a food product.

PRIOR ART

Ohmic heaters are known comprising:
a rectifier for rectifying three-phase supply voltage;
capacitors that level the output voltage from the rectifier;
an inverter, located downstream of the capacitors, that generates the desired waveform;
a transformer located downstream of the inverter that multiplies the voltage in order to adapt it to the different conductivity of the product to be heated;
a bank of capacitors connected to each other in parallel and located upstream and in series to the transformer to protect it from overheating generated by a continuous component of the voltage (undesired, but unavoidable, consequence of the action of the inverter);
a pair of electrodes intended to come into contact with the product to be heated.

A drawback of this solution is linked to the fact that the capacitors that level the output voltage from the rectifier are bulky, considering the powers involved (typically around 50-100 kW). Furthermore, electrolytic capacitors must be used, which have significant costs and above all could constitute a weak link in the reliability of the device (in terms of duration and required maintenance).

A similar drawback is linked to the bank of capacitors in parallel which however necessitate a significant footprint.

AIM OF THE INVENTION

In this context, the technical task underpinning the present invention is to provide an ohmic heater and operating method which obviate the drawbacks of the prior art as cited above.

In particular, an object of the present invention is to provide an ohmic heater which allows the optimization of costs and improved reliability.

The technical task set and the objects specified are substantially attained by an ohmic heater and operating method, comprising the technical characteristics as set out in one or more of the accompanying claims.

BRIEF DESCRIPTION OF THE DRAWINGS

Further characteristics and advantages of the present invention will become more apparent from the approximate and thus non-limiting description of a preferred, but not exclusive, embodiment of a heater, as illustrated in the accompanying drawings, in which:

FIG. 2 shows a voltage-time diagram indicating the waveform generated by the rectifier of the heater of FIG. 1;
FIG. 3a shows a voltage-time diagram indicating the waveform generated by the inverter of the heater of FIG. 1;
FIG. 3b shows a voltage-time diagram indicating the waveform generated by the transformer of the heater of FIG. 1.

DETAILED DESCRIPTION OF PREFERRED EMBODIMENTS OF THE INVENTION

An ohmic heater is denoted in the appended figures by reference number 1. It is typically used to heat a food product.

Figure 1:
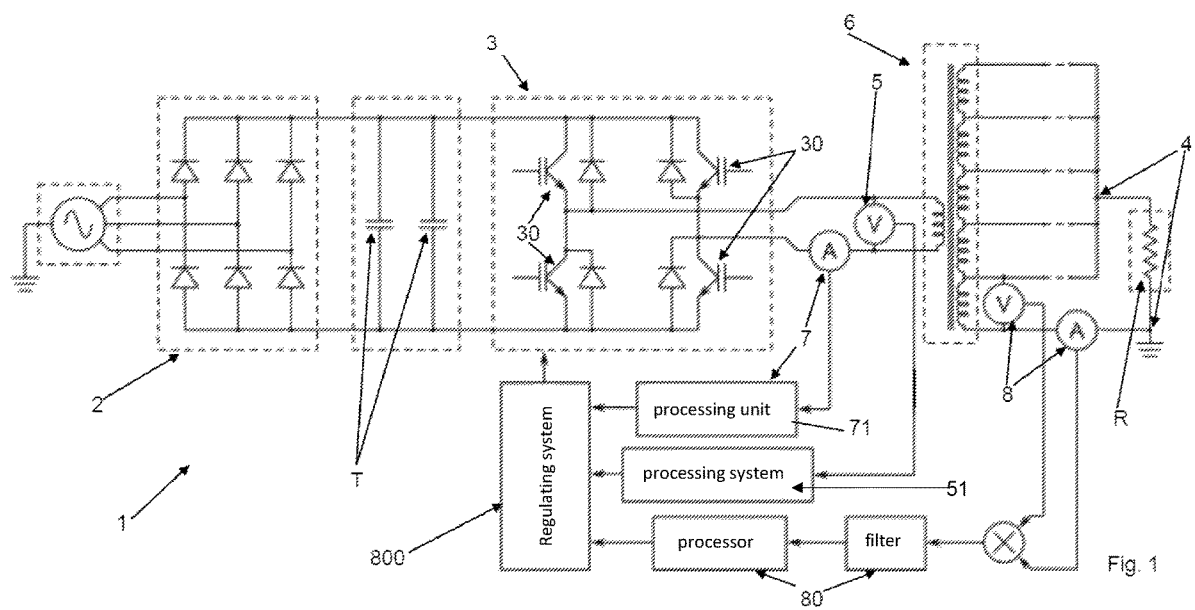
FIG. 1 shows a schematic view of a heater according to the present invention.

The ohmic heater 1 comprises a rectifier 2 of the supply voltage. It can for example comprise a diode bridge as shown in FIG. 1. More in detail in the solution of FIG. 1, the rectifier comprises 3 IXYS MDD 172/16 modules.

The supply voltage is alternating and the rectifier 2 would ideally generate continuous voltage. In practice, for reasons relating to the structure of the rectifier 2, the voltage that is generated is variable in time (see FIG. 2). A diagram that shows the time on the abscissa and the voltage on the ordinate draws many sinusoid arcs that are repeated identically. In the case of a three-phase diode bridge, the frequency of these sinusoid arcs is equal to 300 Hz (if the supply voltage is equal to 50 Hz).

The heater 1 further comprises an inverter 3 in turn comprising controlled switches 30. The term controlled switches is used to indicate that it is possible to intervene on the time instants and intervals of opening/closing the switches 30 in order to obtain the desired alternating waveform Y downstream (see FIG. 3a). Throughout the present description, it should be noted that the term closed switch is intended as a switch that allows the passage of current. On the contrary, the term open switch is intended as a switch that prevents the passage of current.

Figure 4:
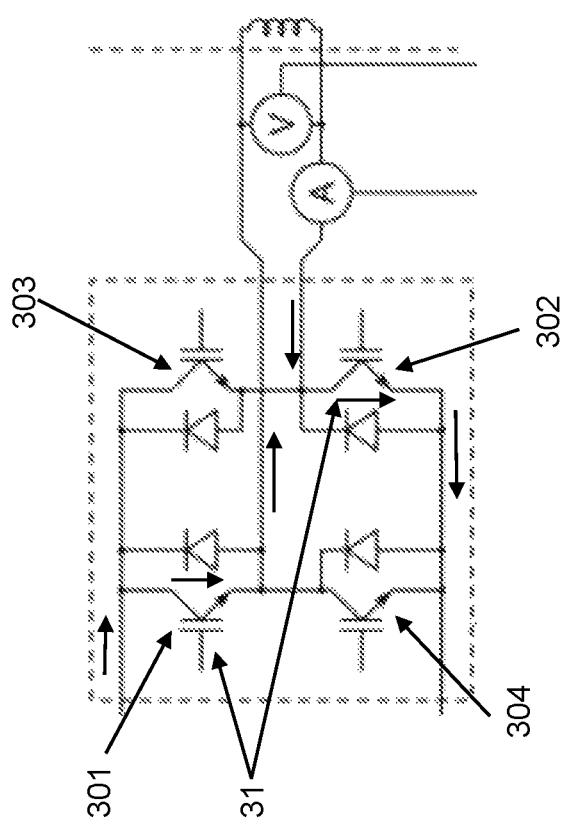
FIG. 4 shows the path of the current in a first operating mode of the inverter of FIG. 1.
Figure 5:
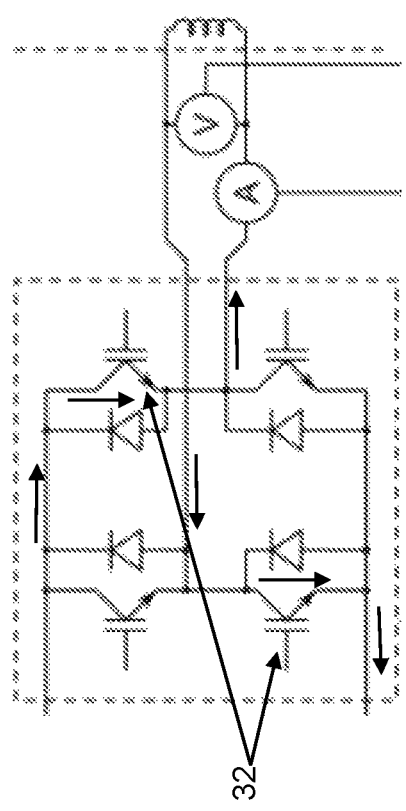
FIG. 5 shows the path of the current in a second operating mode of the inverter of FIG. 1.

In the preferred embodiment (see for example FIG. 1) the inverter 3 is an H-bridge inverter. The switches 30 of the inverter 3 define the switches 30 of the H-bridge 3. In particular they define at least a first and a second pair 31, 32 of switches 30 which close alternately (causing the alternation of the first and second operating mode illustrated respectively in FIG. 4 and FIG. 5) generating an alternating voltage downstream. The first pair 31 of switches 30 advantageously comprises a first and a second switch 301, 302. The second pair 32 of switches comprises a third and a fourth switch 303, 304. The first and third switch 301, 303 are the switches at the top of the H-bridge. They are also called "source" (or "high side switch") in the technical field. The second and fourth switch 302, 304 are the switches at the bottom of the H-bridge. They are also called "sink" (or "low side switch") in the technical field. Unless the heater 1 operates in conditions of maximum power between the first and second operating mode described above, a time interval is envisaged wherein the first and third switch 301, 303 are closed or the second and fourth switch 302, 304 are closed so that the output voltage is null.

In FIG. 3a:
the positive pulse indicated by reference letter A is associated with the closing of the first pair 31 of switches;
the portion with null voltage indicated by reference letter B is associated with the closing of the first and third switches 301, 303 or the second and fourth switches 302, 304;
the negative pulse indicated by reference letter C is associated with the closing of the second pair 32 of switches.

In the preferred embodiment, the inverter 3 is of the H-bridge IGBT type (Insulated Gate Bipolar Transistor), appropriately class 1200 V.

In the preferred embodiment the heater 1 comprises a pair 4 of electrodes which can be arranged in contact with the food product to be heated (in FIG. 1 the product to be heated is shown with resistance R). The passage of current between the pair 4 of electrodes causes the passage of current in the product interposed between them, causing its heating by the Joule effect (this is the general peculiarity of ohmic heaters). The product that is heated has a fluid structure in which solid elements can also be dispersed.

The inverter 3 is operatively interposed between the rectifier 2 and the pair 4 of electrodes.

The heater 1 comprises means 5 for determining an oscillating voltage X generated by the rectifier 2. This is the voltage which is located immediately downstream of the rectifier 2. It is the voltage that can be detected on the bus interposed between the rectifier 2 and inverter 3 (which is why it can also be defined bus voltage). The voltage means 5 determines the voltage shown in FIG. 2.

It can therefore measure the voltage in an area between the rectifier 2 and the inverter 3. It could however also measure the voltage downstream of the inverter 3 from the moment that the envelope of the voltage-time curve downstream of the inverter 3 makes it however possible to determine (by means of the data processing system 51) the trend of the voltage X generated by the rectifier 2 (i.e. the voltage which is visible in a zone between the rectifier 2 and the inverter 3). The latter solution is that shown in FIG. 1.

In fact, the wave Y of alternating voltage generated by the inverter 3 has a frequency (in the preferred solution between 20000 and 40000 Hz, preferably 30000 Hz) that is at least 30 times greater than the frequency of said variable voltage X generated by the rectifier 2 (which is 300 Hz), as indicated previously.

The wave Y generated by the inverter 3 is substantially a square wave. It is bipolar.

The heater 1 further comprises a system 800 for regulating the closing duration of the switches 30 of the inverter 3 at least as a function of the corresponding variable voltage X determined (at a given time instant) by the means 5 for determining an oscillating voltage X (see FIG. 2). The system 800 for regulating the closing duration of the switches 30 of the inverter 3 makes it possible to regulate, instant-by-instant, the closing time of both the first and the second pair 31, 32 of switches 30. In particular the system 800 for regulating the closing duration of the switches 30 makes it possible to regulate the time instant wherein both the first and the second pair 31, 32 of switches open and the one in which they close.

The use of the means 5 for determining an oscillating voltage X is necessary in the absence of capacitors capable of levelling the output voltage from the rectifier 2. The capacitors indicated with reference letter T in FIG. 1 make it possible to absorb sudden surges in voltage associated with the switching of the switches 30, but do not allow the levelling of the output voltage X from the rectifier 2.

The system 800 for regulating the closing duration of the switches 30:
as the voltage X generated by the rectifier 2 and detected by the means for determining an oscillating voltage X decreases; and
with the other conditions being the same;
determines an increase in the duration of pulses (of non-null amplitude) in a wave Y of alternating voltage that determines the passage of an electric current between a pair 4 of electrodes located downstream of the inverter 3 and vice versa.

The system 800 in particular determines an increase in the closing duration of the first and second pair 31, 32 of switches as the voltage X generated by the rectifier 2 and detected by the means 5 for determining an oscillating voltage X decreases (the first and second pair 31, 32 of switches therefore remain more closed respectively during the first and second operating mode). The system 800 for regulating the closing duration of the switches 30 similarly causes a reduction in the closing duration of the first and second pair 31, 32 of switches as the voltage X detected by the means 5 for determining an oscillating voltage X increases. In other words, a perfectly levelled voltage is not used in order to avoid large, expensive and delicate capacitors and therefore a pulse width modulation is performed on the voltage-time curve generated by the inverter 3 to compensate for the variability of the bus voltage X.

If the means 5 indicates that the bus voltage X (on the ordinate) increases, then the width of the pulse (on the abscissa) should be restricted and therefore the closing time of at least a part of the switches 30. This occurs without changing the frequency of the wave Y of FIG. 3a. This is achieved by accordingly regulating the duration of the interval wherein the switches 30 determine the space B at null voltage indicated in FIG. 3a. If the means 5 indicates that the bus voltage (on the ordinate) decreases, then the width of the pulse (on the abscissa) should increase and therefore the closing time of at least a part of the switches 30.

The regulation of the closing duration of the switches 30 therefore makes it possible to keep the power output constant in time as a function of the signal coming from the means 5 for determining an oscillating voltage X. This makes it possible to properly heat the product that passes between the pair 4 of electrodes.

Appropriately, the heater 1 comprises a transformer 6 located between the inverter 3 and the pair 4 of electrodes for regulating the amplitude of the voltage (and therefore obtaining the curve of FIG. 3b). This makes it possible to adapt the voltage as a function of the resistivity of the product to be heated. When the resistivity is low, it is necessary to amplify the voltage value more than when the resistivity of the product is low.

Advantageously, but not necessarily, the heater 1 comprises means 7 for determining the continuous component of the current in a zone downstream of the inverter 3 and upstream or at the transformer 6. The means 7 for determining the continuous component as such is known and in the preferred embodiment comprise a Hall-effect current transducer.

The means 7 for determining the continuous component comprises a data processing unit 71 that processes the measured current in order to be able to extract the value of the continuous component in a known manner.

This continuous component is an undesired consequence of the fact that there may be minimal asymmetries in the components of the inverter 3 (due to the fact that this is a real device and not an ideal one). The transformer 6 is very sensitive to this continuous component, which even with relatively small values is capable of damaging it. There are devices to minimize the sensitivity of the transformer 6 to such a continuous component, but they penalize efficiency and are therefore to be avoided.

On this point, the system 800 for (instant-by-instant) regulation of the closing duration of the switches 30 of said inverter 3 operates in order to minimize or best nullify the signal coming from the means 7 for determining the continuous component.

The system 800 for regulating the closing duration intervenes on the waveform Y and in particular intervenes instant-by-instant:

on the width of the positive pulses of the waveform Y (which lie above the axis of abscissas); or on the width of the negative pulses of the waveform Y (which lie below the axis of abscissas).

The elimination of bulky capacitors makes it possible to considerably reduce the size of the heater 1.

In the preferred embodiment the rectifier 2, the inverter 3 and the transformer 6 can be placed in a parallelepiped casing having the size 300×300×800 mm.

Advantageously the heater 1 comprises a cooling plate provided with a coil wherein a cooling fluid circulates. It allows the cooling of power electronic components. Preferably this cooling plate is made of aluminium. Appropriately the coil passes under the inverter 3 and the rectifier 2.

An operating method of an ohmic heater 1 also constitutes a subject matter of the present invention. It is advantageously implemented by an ohmic heater 1 having one or more of the characteristics described in the foregoing. The method comprises the step of rectifying an alternating supply voltage by means of a rectifier 2. Advantageously the rectifier 2 is a three-phase diode type. It generates a variable voltage X in time (the bus voltage described above and shown in FIG. 2). As indicated above, a diagram that shows the time on the abscissa and the voltage on the ordinate draws many sinusoid arcs that are repeated identically (with a frequency of 300 Hz if the supply voltage is 50 Hz).

The method further comprises the step of determining said variable voltage in time (generated by the rectifier 2; it is therefore the voltage which is located immediately downstream of the rectifier 2). This takes place through the means 5 for determining an oscillating voltage generated by the rectifier 2. In fact, the present invention does not seek to level this voltage, but to take account of such unevenness to still be able to exploit it in the best of ways.

The method also comprises the step of regulating the closing time of the switches 30 forming part of an inverter 3 to compensate the oscillations of said variable voltage X over time. As previously explained, in the preferred embodiment this inverter 3 is an inverter 3 comprising an H-bridge.

Decreasing values of the variable voltage X (generated by the rectifier 2) are associated with an increasing time of the pulses (amplitude is not null) of a wave of the alternating voltage generated by the inverter 3 and vice versa.

This wave, possibly amplified at will, determines the passage of an electric current between at least one pair 4 of electrodes located downstream of the inverter 3. In this way the electric current passes through the product present between the electrodes 4, heating it by the Joule effect. The step of amplifying or reducing the amplitude of the waveform Y of the voltage generated by the inverter 3 preferably takes place through a transformer 6 located downstream of the inverter 3 and upstream of the pair 4 of electrodes.

The waveform Y of the alternating voltage generated by the inverter 3 has a frequency that is at least 30 times greater (preferably at least 90 times greater) than the frequency of said variable voltage generated by the rectifier 2.

The step of regulating the closing time of the switches 30 envisages compensating for a reduction/increase in the variable voltage determined by the means 5 for determining an oscillating voltage X respectively with a longer/shorter closing duration of a part of said switches 30. Because of the significant difference in frequency between the wave Y generated by the inverter 3 and that by the rectifier 2, during the time interval wherein a pair of switches remains closed, the voltage X generated by the rectifier 2 does not in fact change significantly.

Suitably the step of regulating the closing time of the switches 30 envisages varying the area under the profile of said wave Y in a Cartesian diagram having voltage on the ordinate and time on the abscissa while keeping the power delivered by the ohmic heater 1 in line with what is desired.

In the embodiment exemplified in FIG. 1 the diode inverter 3 comprises a first and a second pair 31, 32 of switches (IGBT). The positive pulses of the voltage wave Y (the positive parts in FIG. 3a) are associated with the closing of the first pair 31 of switches and the opening of the second pair 32 of switches (see FIG. 4). The negative pulses of the voltage wave Y (the negative parts of FIG. 3a) are associated with the opening of the first pair 31 of switches and the closing of the second pair 32 of switches (see FIG. 5).

A second control can advantageously be added to this first control, which acts in a substantially independent manner with respect to the first.

This second control comprises the step of determining the continuous component of the electric current entering the transformer 6.

In fact, the step of regulating the closing time of the switches 30 being part of the inverter 3 advantageously takes place as a function of the continuous component of the electric current entering the transformer 6. The purpose of this second control is to suppress/reduce the continuous component. As previously explained, this continuous component is in fact deleterious to the transformer 6.

The step of suppressing/reducing the continuous component envisages regulating the closing time of the switches 30 in order to vary the width of a plurality of positive pulses or alternatively of a plurality of negative pulses of said wave Y of alternating voltage. By modifying the width of the positive pulses (without also modifying the width of the negative pulses or modifying it in the opposite direction), the average value of the wave changes. Similarly, it changes by modifying the width of the negative pulses (without also modifying the width of the positive pulses or modifying it in the opposite direction).

Consequently if at the input of the transformer 6 a continuous component of the current is measured with a positive sign, the method envisages increasing the width of the negative pulses of the wave Y, while leaving unaltered the width of the positive pulses of the wave Y. Alternatively, it is possible to reduce the width of the positive pulses of the wave Y while leaving unaltered the width of the negative pulses of the wave Y.

Similarly if at the input of the transformer 6 a continuous component of the current is measured with a negative sign, the method envisages increasing the width of the positive pulses while leaving unaltered the width of the negative pulses of the wave Y. Alternatively it is possible to reduce the width of the negative pulses, leaving unaltered the width of the positive pulses.

The frequency with which such modification takes place is preferably comprised between 25000 Hz and 40000 Hz.

The modification of the width of these pulses is regardless contained, and therefore does not generate variations which can significantly alter the overall power delivered by the heater 1.

A third control, which however is much slower than the two controls described above, is linked to the power of the heater 1. In order to monitor the power, the method envisages measuring the current and the voltage on the load (on the pair of electrodes 4). In FIG. 1 this measurement is performed by the sensors indicated by reference number 8. This data is then filtered and processed by the means 80.

Depending on the power required, the method then envisages widening the width of the positive and negative pulses. The regulation resulting from the first and second control is added to this first regulation. In this respect the first and second control will determine two coefficients that will have to be multiplied by the width of the pulses required by the power so as to correct the actual width of the pulses. This advantageously takes place in the modulation unit 800.

The present invention achieves important advantages.

Firstly, it makes it possible to avoid the use of large capacitors which have significant purchase and maintenance costs. Furthermore, from the point of view of reliability and life cycle duration, a weak link in the chain consists of all the components of the heater 1.

The invention as it is conceived is susceptible to numerous modifications and variations, all falling within the scope of the inventive concept characterising it. Furthermore, all the details can be replaced with other technically-equivalent elements. In practice, all the materials used, as well as the dimensions, can be any according to requirements.

The invention claimed is:

1. An ohmic heater for heating a food product, comprising:
    a rectifier (2) for rectifying the supply voltage;
    an inverter (3) comprising controlled switches (30);
    a pair (4) of electrodes that can be positioned in contact with the food product to be heated, said inverter (3) being operatively interposed between the rectifier (2) and the pair (4) of electrodes;
    characterised in that it comprises:
    means (5) for determining an oscillating voltage (X) generated by the rectifier (2);
    a system (800) for regulating the closing duration of the switches (30) of the inverter (3) at least as a function of the corresponding voltage (X) generated by the rectifier (2) and determined at a given time instant by the means (5) for determining an oscillating voltage (X);
    a transformer (6) located between the inverter (3) and the pair (4) of electrodes for regulating the amplitude of the voltage acting on the food product;
    means (7) for determining the continuous component of the current in a zone downstream of the inverter (3) and upstream or at the transformer (6);
    the system (800) for instant-by-instant regulation of the closing duration of the switches (30) of said inverter (3) operates in order to suppress the continuous component of the current detected by said means (7) for determining the continuous component of the current.

2. The heater according to claim 1, characterized in that:
    as the voltage (X) generated by the rectifier (2) and detected by the means (5) for determining an oscillating voltage (X) decreases; and
    with the other conditions being the same;
the system (800) for regulating the closing time of switches (30) determines an increase in the duration of pulses of non-null amplitude in a wave (Y) of alternating voltage that determines the passage of an electric current between a pair (4) of electrodes located downstream of the inverter (3) and vice versa.

3. The heater according to claim 1, characterised in that the inverter (3) is an H-bridge inverter and the switches (30) of the H-bridge (3) define at least a first and a second pair (31, 32) of switches (30) and close alternatively generating an alternating voltage downstream.

4. A method for operating an ohmic heater, comprising the steps of:
    rectifying an alternating supply voltage by means of a rectifier (2), said rectifier (2) generating a variable voltage over time;
    measuring over time said variable voltage (X) generated by the rectifier (2);
    regulating the closing time of the switches (30) being part of an inverter (3) to compensate over time for the oscillations of said variable voltage (X); closing times of the switches (30) that generate pulses of decreasing duration in a wave (Y) of alternating voltage being associated with increasing voltage (X) values, which determines the passage of an electric current between a pair (4) of electrodes located downstream of the inverter (3); the step of regulating the closing time of the switches (30) envisages compensating for a reduction/increase in variable voltage measured with a longer/shorter duration, respectively, of the closing of a part of said switches (30).

5. The method according to claim 4, characterised in that said wave (Y) of alternating voltage generated by the inverter (3) has a frequency that is at least 30 times higher than the frequency of said variable voltage generated by the rectifier (2).

6. A method for operating an ohmic heater, comprising the steps of:
    rectifying an alternating supply voltage by means of a rectifier (2), said rectifier (2) generating a variable voltage over time;
    measuring over time said variable voltage (X) generated by the rectifier (2);
    regulating the closing time of the switches (30) being part of an inverter (3) to compensate over time for the oscillations of said variable voltage (X); closing times of the switches (30) that generate pulses of decreasing duration in a wave (Y) of alternating voltage being associated with increasing voltage (X) values, which determines the passage of an electric current between a pair (4) of electrodes located downstream of the inverter (3);
    amplifying or reducing the amplitude of the voltage of said wave (Y) by means of a transformer (6) located downstream of the inverter (3) and upstream of the pair (4) of electrodes;
    determining a continuous component of the electric current at the inlet of the transformer (6);
the step of regulating the closing time of the switches (30) being part of the inverter (3) also taking place as a function of the continuous component of the electric current entering the transformer (6) so as to suppress such continuous component.

7. The method according to claim 6, characterised in that the step of suppressing the continuous component envisages regulating instant-by-instant the closing time of the switches (30) in order to vary the width of a plurality of positive pulses or alternatively of a plurality of negative pulses of said wave (Y) of alternating voltage.

* * * * *